Aug. 28, 1934.  C. B. HUNTMAN  1,971,959
EQUALIZING AND SHOCK ABSORBING MEANS FOR VEHICLES
Filed May 2, 1934
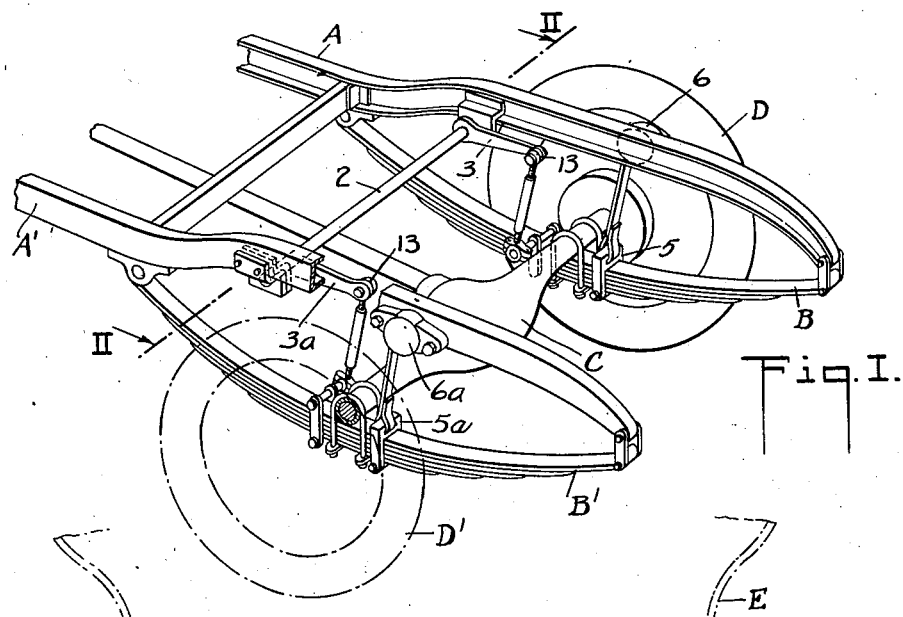
Fig. I.
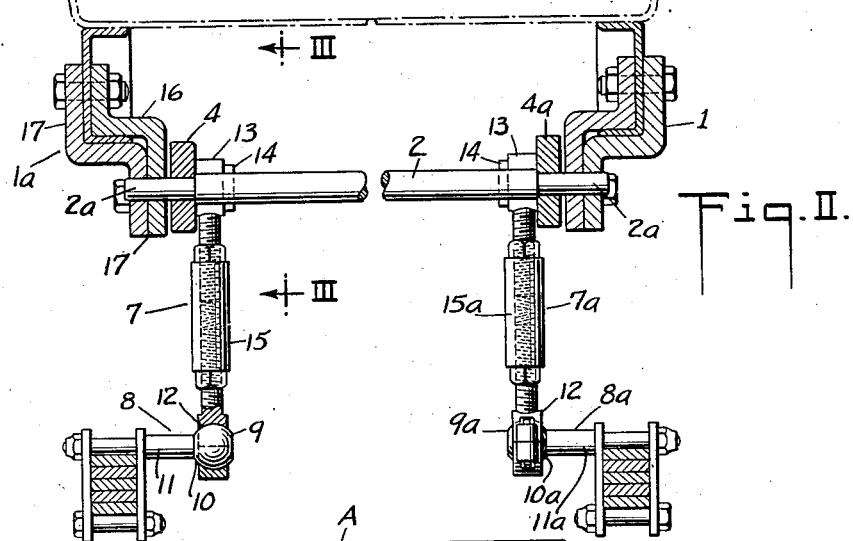
Fig. II.
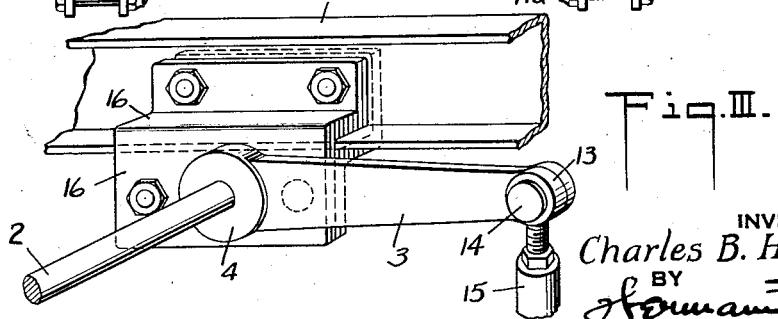
Fig. III.
INVENTOR
Charles B. Huntman
BY
ATTORNEY Patented Aug. 28, 1934

1,971,959

UNITED STATES PATENT OFFICE 1,971,959

EQUALIZING AND SHOCK-ABSORBING MEANS FOR VEHICLES

Charles B. Huntman, Plainfield, N. J., assignor to Huntman Stabilizer Corporation Application May 2, 1934, Serial No. 723,489

2 Claims. (Cl. 267—11)

This invention relates to the equalizing or balancing of shocks such as are involved in motor cars when wheels on one side are displaced by the uneven contour of the road, or when the centrifugal strain tends to careen the body when a car at speed is deflecting its course. My invention deals with the method of absorbing such shocks or strains, balancing the effect of the strains on both sides of the car, dampening the reaction of any wheel or body displacement due to such shocks, and various other advantages which will appear from a more detailed description hereinafter set forth, and, furthermore, involves apparatus to accomplish these results.

One of the main features of my invention involves the transmission of the shock and consequent relative movement of the wheel with respect to the frame on one side of the car, to a device on the opposite side of the car where a regular suspension, comprising a spring or springs supports the frame and load on a wheel support. Thus the springs on one side absorb or resist the displacing action on the opposite side. Furthermore, it interconnects both sides of the car to the suspension of the axle ends or wheel-bearing members in such a manner that the displacement on either side by uneven road surface will encounter shock reaction by the wheel suspension on the opposite side, and thereafter will dampen the return movement of the displaced parts on both sides. Furthermore, accomplishing a similar result when the relative displacement is due to the tendency of the body or the superload on a chassis to cause uneven deflection of springs on opposite sides due to the centrifugal force when speeding around curves or the like.

It should be observed that because of the equalizing connection from side-to-side, the snubbers or shock absorbers are both at all times effective for dampening both wheels, whether the road shock to be dampened primarily affects one or both wheels. And in the case of restraining or minimizing the roll or sidesway on curves, the cooperation of the shock absorbers with equalizing bar dampens the vertical movement of the body or load equally on both sides, when the car comes out of the curve and the centrifugal force has ceased its compression-effect on the spring system, which has been equalized from side-to-side and consequently caused a lowering of the body to a degree depending upon the speed of the car, the radius of the curve and the load and spring characteristics, as well as the centre of gravity, wind and other effects involved in each particular car and the conditions of operation.

Many variations in the apparatus may be made to practice my laterally stabilizing shock-absorbing and dampening in vehicles, and to clearly set forth my invention it will now be described in one particular form of embodiment in a usual type of motor car.

This application relates to another embodiment of the invention broadly set forth and claimed by me in application for United States Letters Patent Serial No. 51,908 filed August 24, 1925, in which the invention is more particularly described with respect to one of the embodiments of my invention.

The device for this present application is a modified form of structure designed to accomplish certain functions also performed by the device of my said former application. It aims to accomplish these purposes in a manner to satisfy conditions found in certain types of associated apparatus. The apparatus herewith claimed is designed to effect by mechanical means, cross car stabilizing and dampening as between sprung and unsprung masses of the car.

A particular example of my construction is shown in the accompanying drawing, in which:

Fig. I is a perspective of the rear end of a chassis showing the embodiment of my invention in conjunction with the essential parts of a car.

Fig. II is a section on the line II—II of Fig. I, also indicating fragmentary a car body in dot-and-dash lines.

Fig. III is a fragmentary perspective view at a section III—III of Fig. II.

The automobile chassis comprises the sills A, A' and springs B, B' and a rear axle housing C, at the ends of which wheels D, D' are supported. In Fig. II a conventional body E is shown in dot-and-dash lines, which with the frame and associated parts make up the sprung mass.

On the sills A, A' bearings 1 and 1ª are attached providing for the support of a transverse bar 2 adapted to turn in the bearing blocks, and at either end adjacent each bearing torque-arms 3, 3ª are rigidly attached to move as a unit with bar 2 by their respective hubs 4, 4ª, which, as shown, are shrunk onto the ends 2ª, 2ª of bar 2 to provide a rigid fit, but may be otherwise secured as by a squared or hexagonal or splined joint as shown, said arms 3ª rigidly transmit torque to and from the bar, but are flat permitting any required twisting with lateral movement of the link 15. The opposite end of each arm is connected by a link to the axle or axle housing, or as shown it is fastened to a member attached to the vehicle springs close to the place of attachment of the springs to the axle housing constituting the wheel support. Close to the attachment of the spring to the wheel support the end of snubber-bands 5, 5ᵃ are secured in order to transmit any relative motion of the axle or wheel support to a snubber type of shock absorber or dampening mechanism 6, 6ᵃ.

The links 7, 7ᵃ are secured to the attaching clips or lower connections 8, 8ᵃ, by ball joints 9, 9ᵃ, one end of each link is attached to the movable end of one of the levers 3, 3ᵃ by a stud or pin 14 passing through an eye in the link end 13. Intermediate the ends of each link a sleeve 15, 15ᵃ engages the threaded portions of the link ends, by right and lefthand threads, so that the cooperation permits adjustment by the sleeve 15, 15ᵃ to vary the length of each link, with locknuts at either end of each sleeve to hold them in the desired adjusted position the lower end of each link has the socket members 12—12 and 10 and 10ᵃ engaging the ball 9—9ᵃ which is carried by the stud 11—11ᵃ each arranged as a fixed part of the clip or lower connection 8—8ᵃ rigidly attached to the spring adjacent the end of the axle housing.

The bearing for the bar 2 on each sill comprises the clamp plate 16 and an outer clamp plate 17 nesting on the channel forming the sill, both plates having the lower extensions forming a solid section with a sufficient thickness to provide a bearing for the ends 2ᵃ of the bar 2. These built-up bearings are suitably bolted to the sills and may have their lower extensions bolted together, as shown.

In the form described and shown, it will be noted that the dampening or shock absorber devices are each responsive to the vertical displacement of each wheel, effected through the wheel-supporting member which is displaced with the deflection of the spring on its side, and likewise the mechanical cross-connection, namely, the torque-bar, owing to its arms and links, which are connected close to the wheel support, are deflected or displaced by the relative movement of the spring member with respect to the sill, so that the cross-bar mechanical force transmission must cooperate with the shock absorbers, and vice versa. Their movement at either end of the axle housing, or movement of the attaching means, both for the shock absorber and the cross-bar links, must move simultaneously, and due to the cross-bar connection the shock absorber functioning on one side is directly transferred to the opposite side of the vehicle.

While many variations may be made from the particular parts and connections as specifically shown, it will now be understood that the apparatus comprises a connection from the wheel support, or the spring adjacent to the wheel support, on each side of an automobile, and from such attaching means a link on each side, each operatively connected with the movable end of the lever close to each side sill, while the hub ends of the two levers are rigidly attached each to opposite ends of the transverse bar supported at its ends in bearings each secured to one of the sills on opposite sides of the car frame. Likewise the dampening means, here shown as a snubber, is at each side of the car supported on the sill, and their connection to the wheel-supporting member is close to the cross-bar link connection, so that relative movement of the axle end or wheel-supporting member or the spring rigidly attached thereto, cooperatively effects the movement of both snubber and cross-bar stabilizing member.

Thus any compression of a spring on one side of the car moves the link on that side and oscillates the lever-arm of the transverse or torque-bar, thereby transmitting to the opposite side the torque due to the deflecting force or compressing force on the spring. As the other end of the torque-bar is connected by its arm and link to the wheel support, or, as shown, to the spring close to the axle housing, the torque applied to the transverse bar is transmitted as compressing force on the spring at the opposite side. Likewise, any downward movement of a wheel on one side, as when going into a rut, pulls the lever on its side and transmits torque to the opposite side which is resisted by the spring on the other side, and therefore prevents the one wheel entering a rut from dropping down, as would otherwise be the case if it had no cross-connections with the wheel support on the opposite side. And the snubber on the side where a wheel engages a rut furthermore dampens the tendency of that wheel support to drop, and cooperating with the cross-bar assures the stabilizing effect without any spring vibration.

In the case of driving around a curve the centrifugal force of the mass supported on the sills tends to compress the spring on that side of the car which is on the outside of the curve of the course of the car, but by the equalizing or balancing connections as above described, any compression of the spring on the outside is transmitted by the links, levers and torque-bar, so that the spring on the opposite side of the car, namely, the inside of the curve is also compressed, thereby both springs being forced to move in balanced relation to the sills, and thereby prevent the body from careening, that is the functioning of the structure stabilizes the body of the vehicle against side roll or rocking, while the cooperation of the shock absorbers prevents any continued spring vibration when the centrifugal force ceases.

In other words, the effect of the device above described is to maintain the car body stabilized parallel with the road surface at all times independent of such forces as tend to cause unequal vertical accelerations between wheels on opposite sides, and dampens the springs against any continued vibration and essentially effective on the recoil of the springs after initial compression.

The practical effect of my invention is the stabilizing of a motor car in motion, keeping it substantially on an even keel, and particularly when the car is driven at speed around curves which otherwise would tend to careen the body, while also maintaining the car substantially on an even keel when the wheels on one side go over obstacles or into ruts, and to minimize the rocking or rolling of the body while dampening or deadening any balanced recoil on both sides. In general, it operates as a stabilizer when rounding curves or on rough roads, and an equalizer or counter-balancing means for the car when either stationary or in motion.

While many variations may be made from the particular form of embodiment of my invention specifically illustrated in the accompanying drawing and specifically described, what I claim and desire to secure by Letters Patent is:

1. In a road vehicle having sprung and unsprung parts, spring means operatively connected to the sprung and the unsprung part, said sprung part comprising the body and chassis frame of the vehicle and the unsprung part comprising wheels and an axle, a torque bar rotatable on the sprung part, means to connect the torque bar to opposite ends of the unsprung part adjacent the wheels, said torque bar and connections functioning as an equalizer to constrain the axle to parallel positions relative to the sprung part, and adjustable snubbing means connecting said sprung and unsprung parts near each end of said axle, both said connecting means engaging the unsprung parts at points substantially common to each other, the adjustment of the snubber providing a conjoint and cooperative effectiveness thereof with the equalizer.

2. In a road vehicle having sprung and unsprung parts, spring means operatively connected to the sprung and the unsprung part, said sprung part comprising the body and chassis frame of the vehicle and the unsprung part comprising wheels and an axle, a torque bar rotatable on the sprung part, means to connect the torque bar to opposite ends of the unsprung part adjacent the wheels, said torque bar and connections functioning as an equalizer to constrain the axle to parallel positions relative to the sprung part, and adjustable snubbing means connecting said sprung and unsprung parts near each end of said axle, both said connecting means engaging the unsprung parts at points substantially common to each other, the adjustment of the snubber providing a conjoint and cooperative effectiveness thereof with the equalizer and having the connection of the equalizer to the sprung part so constructed and arranged as to permit universal flexibility at the point of connection.

CHARLES B. HUNTMAN.